United States Patent
Robbins et al.

[11] 3,717,084
[45] Feb. 20, 1973

[54] WATER SPRAY RING FOR CITRUS FRUIT PROCESSING APPARATUS

[75] Inventors: Robert P. Robbins, Lakeland, Fla.; Thierry N. Thys, Oakland, Calif.

[73] Assignee: FMC Corporation, San Jose, Calif.

[22] Filed: Jan. 18, 1971

[21] Appl. No.: 107,212

[52] U.S. Cl. .................. 146/3 R, 146/3 J, 100/73
[51] Int. Cl. ........................... A23n 1/02, B30b 9/02
[58] Field of Search .......... 146/3 M, 3 J, 3 R; 100/73, 100/98

[56] References Cited

UNITED STATES PATENTS

| | | | |
|---|---|---|---|
| 3,123,114 | 3/1964 | Andrews et al. | 146/3 M |
| 3,053,170 | 9/1962 | Cook | 146/3 M |
| 3,078,788 | 2/1963 | Takata | 100/73 |

*Primary Examiner*—Willie G. Abercrombie
*Attorney*—F. W. Anderson, C. E. Tripp and Gary M. Polumbus

[57] ABSTRACT

A device for aiding in the recovery of peel oil from the skin of citrus fruit comprises a band or ring having a groove in its outer circumferential surface with radially directed openings which connect the groove to the inner circumferential surface of the band so that, when the band is placed in a fruit processing apparatus with the groove closed and sealed, liquid can be pumped into the groove causing a spray of liquid to be emanated radially inwardly through the openings onto fruit skins which have been scored to expose the peel oil sacs in the skin.

6 Claims, 6 Drawing Figures

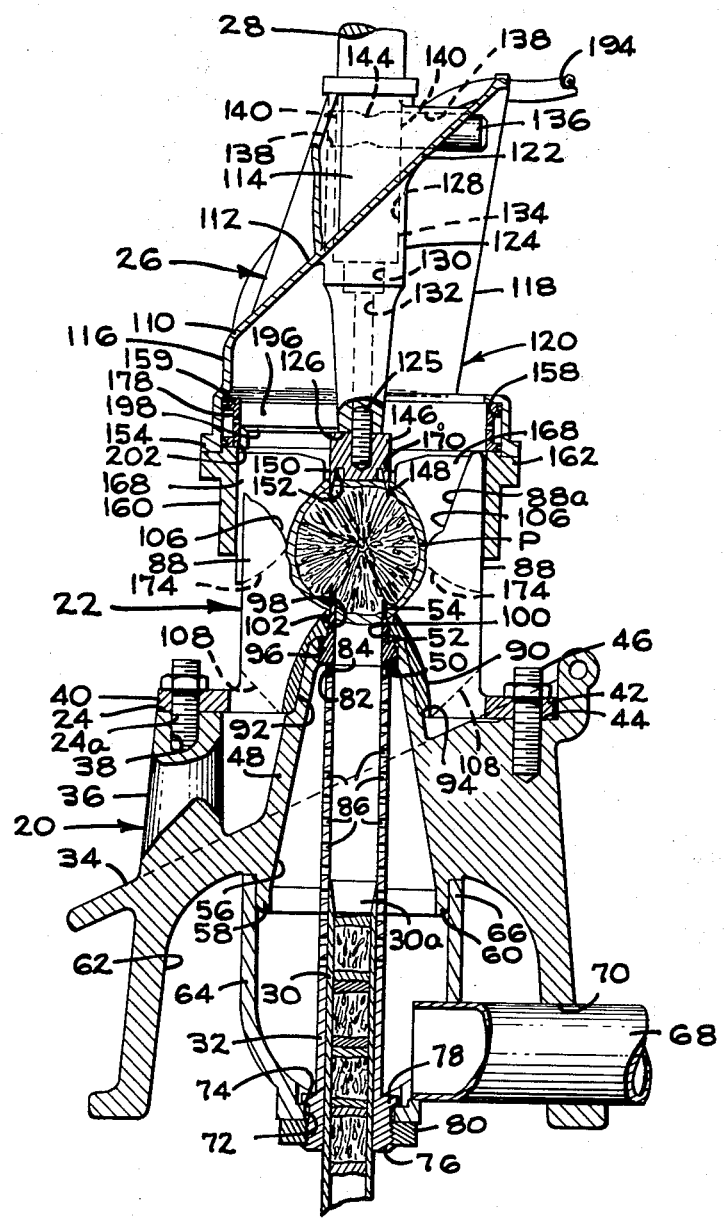

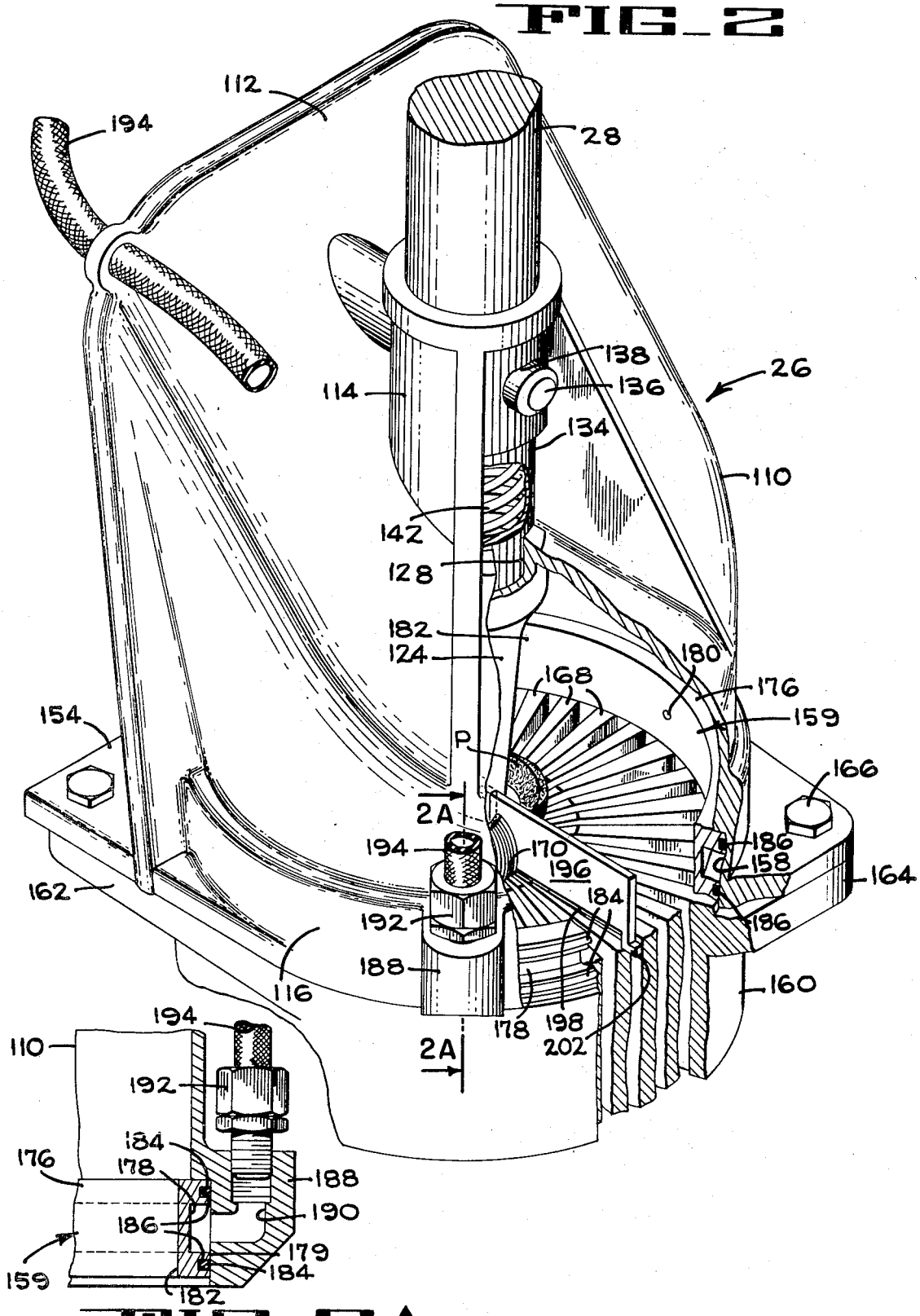

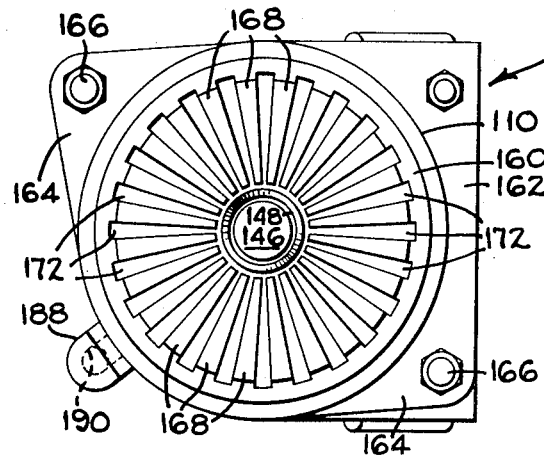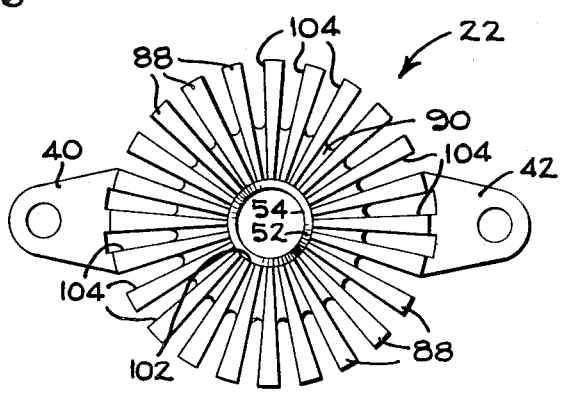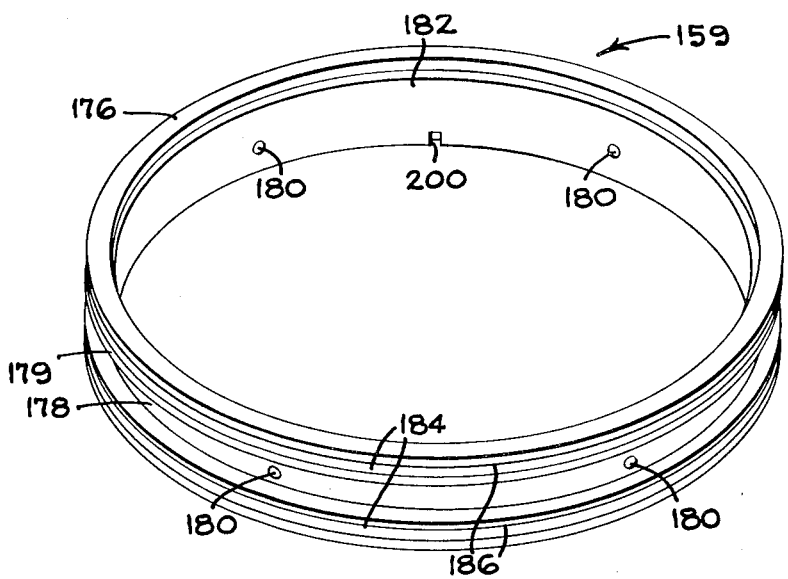

WATER SPRAY RING FOR CITRUS FRUIT PROCESSING APPARATUS

BACKGROUND OF THE INVENTION

1. Field of the Invention

This invention relates generally to fruit processing apparatus and more specifically to a device for aiding in the recovery of peel oil from the peel of citrus fruit.

2. Description of the Prior Art

The complete processing of citrus fruit includes extracting and collecting the juice, extracting and collecting the peel oil, breaking up and ejecting the peel, and de-juicing and discharging the pulp and internal membranes of the fruit. All of the above operations can be performed by an apparatus disclosed in U.S. Pat. No. 2,780,988 issued to Belk et al. on Feb. 12, 1957.

The present invention is concerned only with the operation of extracting and collecting the peel oil. The peel oil of citrus fruit is confined in small peel oil sacs in the flavedo or outermost layer of the fruit skin and can be removed by opening the sacs so that turgor and osmotic pressures will force the peel oil out of the sacs.

In the above mentioned Belk et al. apparatus, the extraction and collection of the peel oil is accomplished by rupturing the peel with a plurality of fruit squeezing fingers and relying upon the fingers to force the peel oil down onto a recovery plate. Subsequent machines have positioned water spray nozzles vertically above the peel as it is separated from the fruit so that the peel oil can be washed from the peel after the peel has been ruptured. By washing the peel oil out of the peel, greater percentages of the total peel oil of the fruit can be recovered since it has been found that without washing, the peel will re-absorb a certain quantity of the peel oil.

SUMMARY OF THE INVENTION

The present invention concerns a water spray ring adapted for use on a machine, such as disclosed in the above mentioned Belk et al. patent, which can effectively wash peel oil from fruit peels with smaller quantities of water than has previously been necessary. The efficiency of the peel oil recovery operation is important to fruit processing inasmuch as peel oil is a valuable commodity being useful in furniture polishes, soft drinks, perfumes, and in some instances to restore flavor in fruit juices.

The spray ring comprises a rigid band having a circumferential groove cut in its outer circumferential surface with sealing O-rings flanking the groove to prevent water from escaping from the groove except through a plurality of radial openings connecting the groove to the inner circumferential surface of the band. The spray ring is adapted to be horizontally mounted in the fruit processing machine of the above mentioned Belk et al. patent adjacent the upper extent of the upper interdigitating fingers. When so located, water can be pumped into the groove whereby horizontal sprays of water will be directed at the fruit peel from close range immediately after the peel oil sacs have been ruptured by the interdigitating fingers in a manner to be described herein.

Accordingly, it is an object of the present invention to provide a device for aiding in the removal of peel oil from the ruptured peel of citrus fruit by forming an emulsion.

It is another object to provide an inexpensive device for use on existing fruit processing machines to aid in the removal of peel oil.

It is another object to fill the spongy cells of fruit peels with water to prevent the cells from reabsorbing the liberated peel oil.

It is still another object to smother with water the oil that spurts from the ruptured peel oil sacs thereby forming an emulsion and capturing the liberated oil.

BRIEF DESCRIPTION OF THE DRAWINGS

FIG. 1 is a fragmentary vertical section through a portion of a fruit processing machine in which the spray ring of the present invention is incorporated.

FIG. 2 is an enlarged isometric view, with parts broken away for clarity, of the support housing for an upper cup assembly of the machine of FIG. 1.

FIG. 2A is a vertical section taken along line 2A—2A of FIG. 2.

FIG. 3 is a bottom view of an upper cup assembly of the machine of FIG. 1.

FIG. 4 is a plan view of a lower cup assembly of the machine of FIG. 1.

FIG. 5 is an isometric view of the spray ring of the present invention.

DESCRIPTION OF THE PREFERRED EMBODIMENT

The present invention constitutes an improved upper cup assembly for the juice extracting machine described and claimed in U.S. Pat. No. 2,780,988 issued to Wilbur C. Belk et al. on Feb. 12, 1957. Complete details of the basic machine and the manner in which the various parts cooperate may be found in the Belk et al. patent and are herein incorporated by reference.

In general, the machine in the Belk et al. patent includes a base section, an intermediate section, and a top power head. The intermediate section includes a supported bedplate 20 (FIG. 1). A series of spaced fruit-receiving lower cups 22 (only one being shown) are secured in rigid stationary position on a top, flat support surface 24 of the bedplate 20 by stud bolts 24a.

An upper cup assembly 26 is mounted on the lower end of a rod 28 above each lower cup 22 so that the upper cup may be moved directly downwardly to engage a fruit disposed in the lower cup. Each cup supporting rod 28 is secured at its upper end to a crosshead member (not shown) which is mounted for vertical reciprocal movement inside the top power head. The crosshead member is reciprocated by drive means which are not disclosed herein but which are fully described in the before mentioned Belk et al. patent.

In the base section of the machine, spaced orifice tubes 30 (only one being shown) are secured in upright position on a vertically reciprocating crossbeam (not shown). The crossbeam is reciprocated in timed relation with the upper cup assemblies 26 by drive means which are not disclosed herein but which are fully described in the before mentioned Belk et al. patent. Each orifice tube is provided with an upper beveled end 30a. The orifice tubes extend upward from the crossbeam into a finisher tube 32, one of which is mounted in the bedplate 20 below each lower cup 22. As the crossbeam is reciprocated each orifice tube 30 slides up and down in the associated finisher tube 32.

A shuffle feeder mechanism (not shown) is arranged to deliver a fruit to each lower cup after a preceding fruit has been processed. The feeder is actuated in timed relation with the movement of the upper cups and the orifice tubes to deposit a fruit in each lower cup when the associated upper cup is in raised position.

It will be apparent that, after a fruit is deposited in each stationary lower cup 22 by the shuffle feeder, the associated upper cup 26 is moved downwardly by the crosshead member to engage the fruit. At the same time, the orifice tube 30 below the lower cup is raised in the finisher tube 32 in timed relation with the lowering of the upper cup.

The bedplate 20 (FIG. 1) of the intermediate section of the machine has a continuous top wall 34 that extends entirely across the machine under all the cups and slants downwardly and rearwardly to provide a drain for peel oil extracted from the peel during the processing of the fruit. A post 36, integrally formed on the top wall 34, extends upwardly therefrom directly opposite each lower cup 22. A tapped opening 38 in the top surface of each post 36 receives the threaded shank of the stud bolt 24a which anchors, to the post, a tab 40 extending outwardly from each lower cup assembly. A diametrically opposite tab 42 is anchored on a flattened surface 44 of the top wall 34 by a stud bolt 46. Directly under each lower cup 22, a support member 48 having a segmental conical exterior surface, extends upwardly from the top wall 34 of the bedplate 20. The support member 48 has a cylindrical aperture 50 at its upper end into which a generally tubular lower cutter unit 52 is pressed. This cutter unit has an upper circular cutting edge 54 to cut a circular plug from the fruit when the fruit is pressed downwardly against the cutting edge. The support member 48 has a downwardly opening and flaring juice passage 56 terminating at its lower end in a lip 58 which is surrounded by a shoulder 60. The base of the bedplate 20 is hollowed out to provide a transverse discharge chamber 62 in which a juice collecting manifold 64 is mounted. The manifold 64 is generally U-shaped in cross-section and extends transversely of the machine under all of the lower cup assemblies. Directly under each cup the manifold has an upwardly extending circular flange 66 which fits snugly over the lower lip 58 for seated engagement against the shoulder 60. An outlet tube 68 extends through one side wall of the manifold 64 and through an opening 70 in the wall of the bedplate 20 to carry off the accumulated juice to a suitable receptacle (not shown).

The manifold 64 is also provided with a series of annular openings 72 in its lower wall, one opening being in alignment with and directly below each tubular lower cutter unit 52. A flattened surface 74 is formed interiorly of the manifold around each annular opening 72. The finisher tube 32 is mounted in upright position in each opening 72 with an enlarged threaded end 76 extending therethrough and an internal annular flange 78 bearing against the flattened surface. A nut 80 is threaded on the end 76 of the tube 32 locking it in upright position on the manifold. The tube extends upwardly through the manifold and through the associated juice passage 56 and has an upper reduced end portion 82 disposed in close fitting, guided engagement in an internal annular recess 84 in the lower cutter unit 52. The walls of each tube 32 are provided with small perforations 86 from the upper end thereof to a point a slight distance below the lower end of the juice passage 56.

Each lower cup 22 (FIGS. 1 and 4) comprises a series of fingers 88 which are equally spaced circumferentially and extend radially inwardly toward a central hub 90 with which they are integrally formed. The hub 90 is hollow and is provided with an internal slanted surface 92 that mates with the conical surface of the support member 48. A lower annular end face of the hub rests on an annular shoulder 94 formed on the exterior surface of the support member 48 and an internal flattened upper end wall 96 of the hub rests on the flattened top end of the support member 48. The hub has an opening at its upper end defined by a counterbore 98 and by a tapered surface 100 that wedgingly engages a similar exterior surface of the cutter unit 52. An annular recess 102 is defined between the upper end of the circular cutter and the wall of the counterbore.

Looking downward on the lower cup assembly in FIG. 4, it will be seen that the fingers 88 of the cups 22 are uniformly shaped and each adjacent pair of fingers is separated by a slot 104 which is slightly wider than one of the fingers 88. It is also to be noted that each mounting tab 40 and 42 is connected to the hub 90 through its connection with the outer ends of three fingers. The fingers (FIG. 1) extend upwardly above the hub 90 and have downwardly and inwardly slanted edges 106 that define a pocket in which the fruit is held as it is processed. Several of the fingers at the rearward side of the lower cup assembly extend upwardly to a point higher than the rest of the fingers to form a high abutment wall 88a to prevent a fruit, which enters the machine at the front side thereof, from escaping over the rear edge of the cup as it is directed into the cup by the shuffle feeder mechanism. All of the fingers except those secured to the tabs 40 and 42, have inwardly inclined lower edges 108.

Each upper cup assembly 26 (FIGS. 1 and 3) comprise a hollow housing 110 open at its lower end and having a top wall 112 with a central hub 114. A skirt-like sidewall 116, depending from the top wall, has an opening 118 (FIG. 1) at the side facing the rear of the machine providing a discharge passage for the fruit peel as it leaves a discharge chamber 120 formed by the hollow interior of the housing. The top wall 112 has an internal surface 122 slanted upwardly and rearwardly toward the peel discharge opening 118. A support member 124, integrally formed with the top wall 112 of the housing 110, extends downwardly from the top wall and has a flat, horizontal lower end face 126. The top wall of the housing 110 has a continuous bore therethrough defined by a large diameter upper bore 128 (FIG. 1), a reduced diameter intermediate bore 130, and a relatively small diameter lower bore 132 which extends downwardly through the support member 124. A tubular lower end 134 (FIG. 2) of the rod 28, which supports the upper cup assembly, is disposed in the large bore 128 and is retained therein by a pin 136 which extends through aligned openings 138 in the hub 114 and through aligned openings 140 in the tubular end of the rod 28. A spring 142 (FIG. 2) which is seated on a disc (not shown) held in the lower end of the rod 28, presses a detent into an annular groove 144 in the outer surface of the pin 136 to prevent sidewise movement of the pin. An upper cutter assembly 146 (FIG. 1) is mounted on the lower end of the support member 124 by a stud bolt 125 which extends through the small bore 132. The upper cutter assembly 146 has a downwardly directed circular cutting edge 148 formed by a beveled surface on a tubular skirt portion 150 that is in vertical alignment with the annular recess 102 formed around the lower cutter unit 52. In the lowermost position of the upper cup 26, the tubular skirt 150 extends down into the recess 102 and the upper edge of the lower cutter 52 extends into an annular recess 152 formed in the body of the upper cutter inside of and concentric with the skirt 150.

The housing 110 has an outwardly extending flange 154 around the lower end of the side wall 116. The lower surface of the flange is counterbored to provide a cylindrical side wall 158 for confining a spray ring 159 to be described in detail hereinafter. A collar 160, mounted below the housing 110, has a flange 162 in abutting contact with the flange 154 of the housing and a reduced diameter upper end disposed in guided engagement with the cylindrical sidewall 158 of the counterbore which serves as a lower support for the spray ring 159. Looking upwardly at the lower end of the upper cup assembly 26 in FIG. 3, it will be seen that the collar 160 has a pair of diametrically opposed, outwardly extending ears 164 that are bolted to corresponding ear portions on the lower end of the housing 110 by bolts 166. A series of fingers 168 are integrally formed with the collar 160 and extend radially inwardly therefrom to terminate in spaced relation from the outer wall of the upper cutter assembly 146 to define an annular passage 170 through which the peel P of the fruit is extruded. The fingers 168 which are equally spaced circumferentially and are identical in configuration, are of a size to pass into the slots 104 between adjacent fingers 88 in the lower cup 22 (FIG. 4). Similarly, slots 172 (FIG. 3) formed between the equi-spaced fingers of the upper cup, are adapted to receive the upwardly extending fingers 88 of the lower cup. In the juice extracting operation, the fingers of the upper and lower cups intermesh to a point where the curved inner edges 174 (FIG. 1) of the upper cup assembly 26 substantially abut the mating curved exterior surfaces of the hub 90 of the lower cup 22 between adjacent fingers 88.

The spray ring 159 is best seen in FIG. 5 and comprises a circular band 176 of rigid material, e.g., a hard plastic, with an annular groove 178 cut in its outer circumferential surface 179. A plurality of equally spaced radially directed openings 180 connect the groove to the inner circumferential surface 182 of the ring. The ring is tightly fitted against the cylindrical sidewall 158 of the housing 110 so that the groove 178 becomes an enclosed passage in which a fluid can pass. To seal the passage so that no fluid can escape along the interface between the outer circumferential surface 179 of the spray ring and the cylindrical side wall 158 of the housing, a pair of sealing O-rings 184, preferably made of rubber, are placed in annular recessed portions 186 of the outer circumferential surface 179. The recessed portions 186 are disposed one on each side of the groove 178.

A boss 188 (FIGS. 2, 2A and 3) protruding from the housing 110 at the lower end of the side wall 116 has an L-shaped passage 190 providing access from the outside of the housing to the groove 178 when the spray ring is in place in the housing. A portion of the passage 190 is internally threaded to threadingly receive an adapter 192 secured to a hose 194 which is connected to a fluid supply (not shown). It will be seen that fluid pumped into the sealed groove 178 through the passage 190 will be forced through the openings 180 and will emanate therefrom as a spray directed horizontally over the upper ends of the fingers 168 of the upper cup assembly 26.

As pointed out hereinbefore, the peel P of the processed fruit is extruded through an annular passage 170 surrounding the upper cutter assembly 146. A flat, upright, knife blade 196 having a downwardly directed cutting edge 198, is mounted on the upper cutter assembly and extends radially outwardly therefrom terminating at the inner circumferential surface 182 of the spray ring. The knife blade serves to slit the peel as it passes through the annular passage 170 and prevents the peel from reaching the discharge chamber thereabove in a closed annular form. A notch 200 cut in the lower edge of the spray ring receives a lip 202 on the knife blade and serves as a positioning guide for the spray ring so that the fluid spray openings 180 in the spray ring will always be located directly above individual fingers 168 of the upper cup assembly. This is necessary to prevent the fingers 88 of the lower cup from obstructing the sprays when the fingers are moved up through the spaces 172 between the fingers 168 of the upper cup during operation.

In addition to the knife blade slitting the peel as it passes through the annular passage 170, the fingers 168 of the upper cup assembly score the outer surface of the peel rupturing the peel oil sacs that are close to the surface. Turgor and osmotic pressures cause the peel oil in the sacs to immediately squirt out of the sacs and there is a tendency for the spongy cells in the peel surrounding the oil sacs to re-absorb the oil. To prevent the oil so liberated from being re-absorbed and to smother the peel oil which is squirted into the air, water or another suitable fluid is sprayed directly onto the skin through the openings 180 in the spray ring immediately after the skin is scored by the fingers 168. It can be seen from the location of the spray ring that the water is sprayed on the peel from a close range so that the spongy cells of the peel will be filled by the water before the peel oil can be re-absorbed. Also, the peel oil in the air will be quickly smothered reducing the loss of oil temporarily suspended in the air. The water sprayed on the peel will form an emulsion with the peel oil and will flow along the outer surface of the hub 90 of the lower cup onto the slanted top wall 34 of the bedplate 20. The bedplate directs the emulsion to a suitable receptacle (not shown) wherefrom the emulsion can be removed and later centrifuged to separate the water from the oil. The water spray is synchronized with the movement of the upper cup assembly so that water is not sprayed until the peel from a fruit being processed emerges above the upper extend of the fingers 168 and the spray is discontinued when the upper cup rises after the processing of an individual fruit.

It has been found by spraying the water on the peel from close range immediately after the peel has been scored that a better percentage of the peel oil can be recovered than has previously been recoverable without the use of the water or by spraying the water on the peel from overhead. In addition, the improved recovery is accomplished with the use of less water than was necessary for a commercial recovery with overhead sprays.

Although the best mode contemplated for carrying out the present invention has been herein shown and described, it will be apparent that modification and variation may be made without departing from what is regarded to be the subject matter of the invention.

What we claim is:

1. In a citrus fruit processing machine comprising a pair of cups arranged in a vertically opposed relationship for receiving a fruit therebetween, means communicating with one of said cups for providing a passage for juice from the interior of said fruit, means for moving said cups together to compress the fruit therebetween and cause the juice to be directed through said passage, means providing an opening extending through one of the cups for permitting the extrusion of the peel during the compression of the fruit, and means providing a plurality of cutting edges on at least one of the cups for scoring the peel to release the peel oil therefrom; the improvement comprising spray means located directly adjacent to the outer portion of the cup through which the peel is extruded for directing sprays of fluid in a generally horizontal plane at the peel as it is extruded to wash the peel oil from the peel.

2. In a citrus fruit processing machine according to claim 1 wherein said spray means is disposed so as to surround the scored peels as they are extruded.

3. In a citrus fruit processing machine according to claim 2 wherein said spray means comprises a ring having a plurality of radially directed openings therein, and means for delivering water to the exterior surface of said ring.

4. In a citrus fruit processing machine according to claim 3 wherein said ring is provided with an annular groove on its exterior surface which communicates with said radially directed openings and wherein said spray water is directed to said groove.

5. In a citrus fruit processing machine according to claim 1 including a housing surrounding the outer portion of the cup through which the peel is extruded; said spray means comprising a ring mounted within said housing provided with a plurality of radially directed openings, means for delivering water to the exterior surface of said ring, and means for sealing said exterior surface of the ring to said housing so that the water is directed from said last named means through said radially directed openings.

6. In a citrus fruit processing machine according to claim 5 wherein said exterior surface of said ring is defined by a pair of annular abutment surfaces separated by an annular groove, said annular groove communicating with said radially directed openings and with said means for delivering water to said groove, and said sealing means comprising an O-ring mounted in each annular abutment surface for sealing said annular groove to the interior wall of said housing.

* * * * *